Feb. 11, 1958   R. G. BAILEY   2,822,852
ADAPTER FOR HOSE COUPLING ATTACHING MACHINE
Filed Aug. 5, 1955
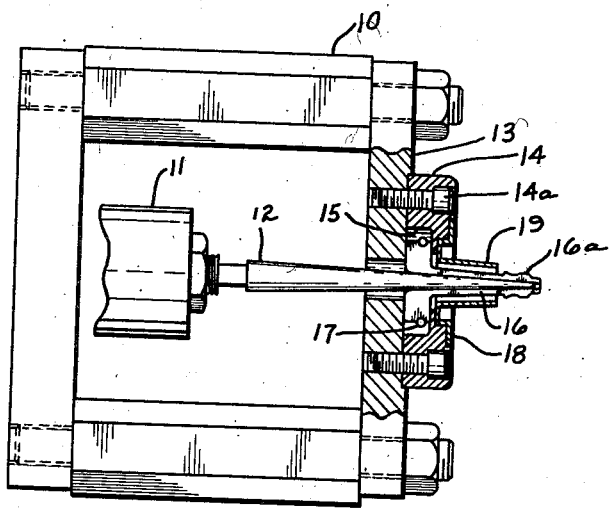
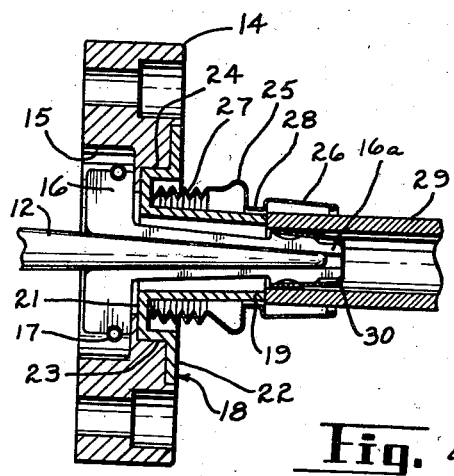
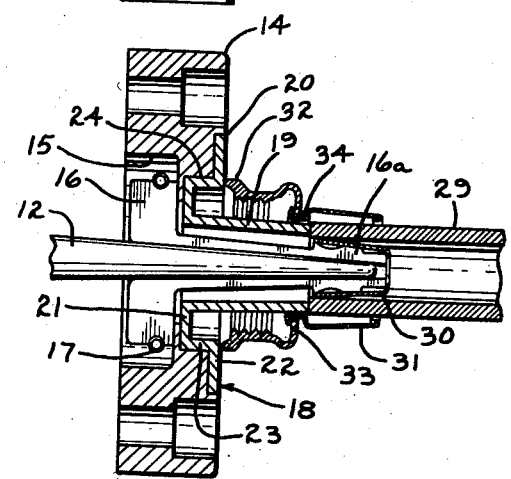
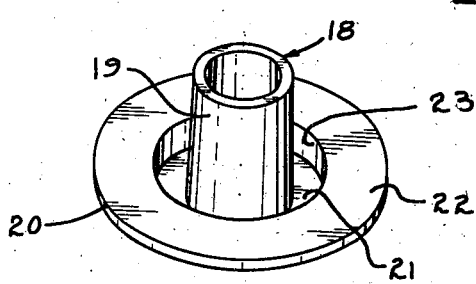
INVENTOR
Robert G. Bailey
BY
H. F. Johnston
ATTORNEY

United States Patent Office 2,822,852
Patented Feb. 11, 1958

2,822,852
ADAPTER FOR HOSE COUPLING ATTACHING MACHINE

Robert G. Bailey, Cheshire, Conn., assignor to Scovill Manufacturing Company, Waterbury, Conn., a corporation of Connecticut Application August 5, 1955, Serial No. 526,693

1 Claim. (Cl. 153—1)

This invention relates to an adapter to be used in association with a machine for attaching couplings to the ends of hose for the purpose of properly registering the hose to the coupling parts when making the assembly.

The introduction of plastic hose in the market has necessitated some changes in the coupling construction in making the coupling more adaptable to the new hose material. One of the changes in coupling constructions is to provide a ductile nipple that is inserted into the end of a hose and expanded outwardly to bind the hose material against a surrounding ferrule. Heretofore a shoulder on the ferrule was relied upon to locate the end of the house in the coupling. It has been found in practice that there is a considerable variation in the thickness of the hose material for standard sizes so that in some cases the hose was pushed beyond the shoulder in the coupling making it difficult to properly locate the end of the hose to the coupling parts in making the assembly with a coupling attaching machine.

It is one of the objects of my invention to provide an adapter to be fitted to conventional coupling attaching machines that will properly locate the end of the hose with reference to the coupling parts.

It is another object of my invention to provide an adapter that can be used with both male and female coupling parts in properly locating the hose relative thereto.

Other objects and advantages of the invention will be apparent from the following description of the invention in connection with the drawing.

Fig. 1 is a partial sectional and partial full view of a portion of a conventional hose nipple expander tool showing my adapter applied thereto.

Fig. 2 is a cross sectional view of the expander part of the tool and the adapter on a larger scale, with a male coupling and hose end in position to be assembled.

Fig. 3 is a similar view showing a female coupling and hose end in position to be assembled, and Fig. 4 is a perspective view of the adapter, per se.

Referring now to the drawing, the numeral 10 designates the frame of a hose coupling attaching machine having a plunger 11 for operating a tapered mandrel 12.

The frame 10 supports a face plate 13 to which is attached a housing member 14 as by cap screws 14a. The housing member 14 is hollowed out and defines with the plate 13 a chamber 15 within which is received a series of sector jaws 16. The jaws 16 are held confined against the mandrel 12 by an encircling coil spring 17.

The adapter is generally indicated by the numeral 18 and consists of a tubular neck 19 and an integral stepped flange or base 20 at its inner end. The stepped base 20 for convenience sake may be described as having an inner flange 21 and an outer flange 22 joined by an intermediate connecting wall 23. The stepped base 20 is fitted into a complementary stepped recess 24 formed in the outer face of the housing member 14 which serves to hold the adapter in axial alignment with the mandrel 12.

Fig. 2 shows the manner in which the male coupling 25 is held in place by the adapter 18. The male coupling here shown consists of a conical ferrule 26, a threaded section 27, and a connecting inwardly formed shoulder 28. The threaded section 27 and shoulder 28 fits about the adapter tubular neck 19 with the end of the threaded section 27 abutted against the inner flange 21 to properly position the conical ferrule 26 relative to the expander ends 16a of the jaws 16.

In the procedure of assembling a hose 29 to the coupling, a ductile nipple 30 is first fitted upon the expander end 16a of the sector jaws 16. The particular coupling (male or female) to be assembled is next slipped over the end of the hose and finally the hose and surrounding coupling is forced over the supported nipple and the coupling moved to abutted position with the adapter as a stop.

The manner of assembling a female coupling with the same adapter 18 is shown in Fig. 3 wherein the coupling consists of a separate ferrule 31 and a nut 32 having a flange 33 swivelly connected in a recess provided by the inwardly formed shoulder 34. The end of the nut 32 is adapted to abut the outer flange 22 of the adapter 18 to properly position the female coupling in the machine for the assembly operation. The hose 29 and the nipple 30 will be assembled in the same manner as described for the male coupling and likewise the end of the hose will abut the end of the adapter tubular neck 19 to properly position it relative to the coupling parts.

In both the male and female couplings it is to be noted that the end of the adapter tubular neck 19 is such that the end of the hose cannot be inserted beyond the inner wall of the shoulder 28 or 34 adjacent the ferrule 26 or 31. Thus my adapter serves to prevent the hose from being inserted too far within the coupling in case the hose is not large enough in diameter to abut the shoulder 28 or 34.

Variations within the spirit and scope of the invention described are equally comprehended by the foregoing description.

I claim:

An adapter for use with a coupling attaching machine for predetermining the position of the end of the hose in the coupling to which it is to be attached and which coupling includes a separate nipple insertable into the hose end, a surrounding ferrule and a male or female threaded fitting attached to the ferrule; said adapter comprising a double stepped flanged base having an inner flange and an outer flange joined by a connecting section, said double stepped flange base adapted to be received in a complementary recess provided in the attaching machine for holding and centralizing the adapter relative to the assembly tools, said inner flange acting as a stop to locate the male fitting and said outer flange acting as a stop to locate the female fitting, and a tubular neck extending outwardly from said stepped base and adapted to extend into the male or female fitting and being of such length as to serve as an abutment to properly locate the hose end when it is inserted into the coupling.

References Cited in the file of this patent

UNITED STATES PATENTS

| 1,753,005 | Grady | Apr. 1, 1930 |
| 1,754,426 | Hodgkinson | Apr. 15, 1930 |
| 1,944,890 | Heidloff | Jan. 30, 1934 |
| 2,508,377 | Doerr | May 23, 1950 |
| 2,623,837 | Butler | Dec. 30, 1952 |
| 2,649,271 | Gosselin | Aug. 18, 1953 |
| 2,735,473 | Diget et al. | Feb. 21, 1956 |